United States Patent
Hutty et al.

(10) Patent No.: US 7,933,815 B2
(45) Date of Patent: Apr. 26, 2011

(54) SYSTEM AND METHOD FOR OBTAINING TECHNICAL SUPPORT SERVICES OVER A NETWORK

(75) Inventors: Ian Austin Hutty, Hull (GB); Michael Barnett, Hull (GB); James Duncan Waltham, Hull (GB)

(73) Assignee: Intellifix (UK) Limited, Hessle (GB)

( * ) Notice: Subject to any disclaimer, the term of this patent is extended or adjusted under 35 U.S.C. 154(b) by 1211 days.

(21) Appl. No.: 11/592,049

(22) Filed: Nov. 1, 2006

(65) Prior Publication Data
US 2008/0103869 A1    May 1, 2008

(51) Int. Cl.
*A01K 5/02*    (2006.01)
(52) U.S. Cl. .............. 705/29; 705/10; 705/1; 705/7; 705/9; 345/705; 717/173; 717/11
(58) Field of Classification Search .............. 705/29, 705/1, 7, 10; 717/173, 11; 345/705
See application file for complete search history.

(56) References Cited

U.S. PATENT DOCUMENTS

| 6,505,166 B1 | 1/2003 | Stephanou |
| 6,507,821 B1 | 1/2003 | Stephanou |
| 6,513,013 B1 | 1/2003 | Stephanou |
| 2002/0147622 A1 * | 10/2002 | Drolet et al. ............... 705/7 |
| 2002/0188486 A1 * | 12/2002 | Gil et al. ............... 705/7 |
| 2003/0028451 A1 * | 2/2003 | Ananian ............... 705/27 |
| 2003/0208417 A1 * | 11/2003 | Heinrichs et al. ............... 705/28 |
| 2006/0253334 A1 * | 11/2006 | Fukasawa ............... 705/26 |
| 2009/0094075 A1 * | 4/2009 | Parisien et al. ............... 705/7 |

* cited by examiner

*Primary Examiner* — Vanel Frenel
(74) *Attorney, Agent, or Firm* — The Marbury Law Group PLLC (57) ABSTRACT

A system and method for obtaining technical support services over a network. A registered seeker of technical support services submits a search request to a task matching server. The search request comprises search criteria for identifying one or more registered providers of technical support services. The task matching server searches a library of provider profiles comprising qualifications of registered providers of technical support services and provides the seeker a list of registered providers meeting the search criteria. The seeker selects a registered provider from the list. The task matching server facilitates the exchange of communications between the seeker and the selected provider. The selected provider sends a quotation for technical support services to the seeker. The quotation comprises service terms under which the selected provider is willing to provide the technical support services. If the seeker accepts the service terms, the task match server establishes a link between a selected provider computer and a seeker computer that allows the selected provider computer to control the seeker computer via the link and to facilitate the provision of technical support services.

24 Claims, 4 Drawing Sheets

SYSTEM AND METHOD FOR OBTAINING TECHNICAL SUPPORT SERVICES OVER A NETWORK

BACKGROUND

Embodiments of the present invention are directed to network access to technical assistance. More particularly the present invention provides a system and method for obtaining technical assistance via a network by allowing seekers of technical support services to identify and select qualified service providers and by providing the selected service provider direct access to a device requiring technical support services via the network.

Modern society is increasingly dependent on technology for communications, entertainment, commerce, and information. Computers, software, and network devices are the building blocks for complex systems that are often forgotten when they are working correctly and disparaged when they fail. A failure of a device, system or software application can be difficult to troubleshoot, even for the most technically savvy individuals.

To support this web of hardware and software, specialists have emerged who are trained to identify the causes of a system failure and to offer solutions to return the failed system to operational status. However, finding an individual with the skills that match a particular failure mode can be a daunting task.

Solutions have been proposed to address this problem. For example, in U.S. Pat. No. 6,507,821 issued to Stephanou (the '821 patent) describes a system that facilitates a communication between client and expert. In order to seek assistance, the client registers and purchases "credits" before he or she can post a service request onto the system. The service request is assigned a job ticket and added to a pool comprising other job tickets. A pooled ticket is claimed by an independent expert registered with the site. Any number of experts are able to view a given unassigned ticket until it is claimed for responsibility by a particular expert. Once claimed, the expert then contacts the assistance seeker who posed the job via email and live text-based chat across the internet. These dialogue methods (email and internet text based chat) are used throughout the life of the ticket. Dialogue takes place between expert and client who carries out the task(s) given to him or her by the expert in their efforts to instruct the client through the necessary steps until such a time that the job is fixed or no resolution can be made, upon acceptance of both parties of course. In summary:

Client registers with site and purchases credit in order to post job or ticket.
  Expert registers with the site and specifies a portfolio of services.
  Experts peruse tickets in a pool comprising tasks that fall within an expert's portfolio of services and claim a ticket when they want to carry out a particular job.
  Client and Expert exchange emails and chat with the expert offering advice on how to affect repair
  The Client under instruction from the expert carries out the tasks as described to him until repair or some other resolution is reached amicably.

While the '821 patent provides a system for communication of a client with an expert, the client does not choose the expert. Rather, the client job is claimed by an expert without the client vetting the qualifications of the expert or interacting with the expert. Additionally, the '821 patent requires a user to prepay before contracting for services from an expert. Further, the actual work is performed by the client, not the expert. The expert can only provide assistance based on what the client reports to the expert. The expert cannot examine a failed device directly and independently determine the nature of the failure and its cause.

What would be beneficial would be a system and method that provides a party seeking technical support services the ability to interact with a party offering to provide repair services and to select a provider of repair services. Such a system and method would facilitate the provision of repair services by the provider of repair services over a network connection.

SUMMARY

In an embodiment of the present invention, a party seeking technical support services (herein, the "seeker") accesses a task matching server (TMS) via a network. In an embodiment of the present invention, the network is the Internet. The seeker searches a library of qualified providers of technical support services (referred to individually as a "provider"). The seeker is provided access to profiles of providers who are qualified to provide technical support services within an assigned classification. The provider operates a provider software module that communicates the provider's current status to the TMS, which status is indicated in the profile of the provider. By way of illustration and not as a limitation, the status comprises an online, an away status, a busy status, and a not-available status. In yet another embodiment of the present invention, the profile of a provider comprises a ranking and a customer satisfaction record.

The seeker may view the profiles of multiple providers and select his or her own provider for a given repair task. One the seeker has selected a provider, the seeker contacts the provider. In an embodiment of the present invention, the seeker operates seeker software module that permits the seeker and the expert to communicate using a live chat protocol. In an embodiment of the present invention, these communications comprise a discussion of the particular repair task, negotiate the provider's fee, and the method for payment, among other subjects. Until the seeker has agreed to engage the provider and the terms on which the services of the provider will be accomplished, no work is performed on the seeker's repair task.

A remote connection between the seeker's computer and the provider's computer is established via a network to allow the provider to undertake the repair task without the need for an exchange of messages between the seeker and the provider and without requiring the seeker to undertake the repair task. In an embodiment of the present invention, the network is the Internet.

In yet another embodiment of the present invention, the seeker software module and the provider software module each comprise an interface that facilitates searching the TMS and for establishing communications between the seeker and provider.

It is therefore an aspect of the present invention to provide an environment where individuals seeking assistance with a repair task can identify, investigate, and select individuals who are qualified to provide the assistance desired by the seeker.

It is another aspect of the present invention to assign a repair task of a seeker to a classification and to provide the seeker profiles of providers who are qualified to provide assistance with repair tasks within that classification.

It is yet another aspect of the present invention to establish a contractual relationship between the seeker and the provider only after the parties have agreed to terms mutually acceptable to both parties.

It is an aspect of the present invention to establish a connection between a computing device of a provider and a computing device of a seeker via a network to allow the provider to undertake the repair task remotely. In an embodiment of the present invention, the network is the Internet.

These and other aspects of the present invention will become apparent from a review of the general and detailed description that follows.

In an embodiment of the present invention, a system for obtaining technical support services over a network comprises a task matching server, a seeker computer connected to the network, and a selected provider computer connected to the network. The network allows access to the task matching server by the seeker computer and the selected provider computer. In an embodiment of the present invention, the network is the Internet. However, this is not meant as a limitation. Any network that provides the connectivity among the task matching server, seeker computer and the selected provider computer may be used without departing from the scope of the present invention.

The task matching server comprises a library of provider profiles comprising qualifications of registered providers of technical support services. In another embodiment of the present invention, the task matching server comprises instructions for recording the qualifications of a registered provider in a registered provider profile. In yet another embodiment of the present invention, the provider profile comprises a status of the provider. By way of illustration and not as a limitation, the status may be indication of an on-line status, an off-line status, a busy status, an away status, and an unavailable status.

In an embodiment of the present invention, the seeker computer submits a search request from a registered seeker to the task matching server. The search request comprises search criteria for identifying registered providers having specific qualifications. The task matching server further comprises search instructions for providing the registered seeker a list of registered providers having provider profiles in the profile library meeting the search criteria. By way of illustration and not as a limitation, in an embodiment of the present invention, the search criteria comprise a requirement that a registered provider have an on-line status and the search instructions provide the registered seeker a list of registered providers having an on-line status.

Additionally, the seeker computer submits a selection request to the task matching server. The selection request comprises an identifier of a selected provider selected from the list.

The task matching server facilitates communication via the network between the seeker computer and a computer of the selected provider (the "selected provider computer"). The communications comprise a request for technical support services from the seeker computer, a quotation for technical support services from the selected provider computer responsive to the request for services, a response from the seeker computer, and a link between the selected provider computer and the seeker computer if the response from the seeker computer is an acceptance of the quotation. The quotation comprises service terms under which the selected provider is willing to provide the technical support services. The selected provider computer controls the seeker computer via the link so as to facilitate the provision of technical support services.

In yet another embodiment of the present invention, the task matching server further comprises instructions for creating a rating for the selected provider based on feedback provided by the registered seeker and for storing the rating in a profile of the selected provider within the library of provider profiles. In yet another embodiment of the present invention, the task matching server further comprises instructions for requesting feedback from the registered seeker upon completion of the provision of technical support services.

In an embodiment of the present invention, the task matching server comprises instructions to measure a connect time during which the seeker computer and the selected provider computer communicate via the link. In yet another embodiment of the present invention, the task matching server comprises instruction adapted to determine a provider fee for use of the task matching server. By way illustration and not as a limitation, in an embodiment of the present invention, the provider fee is computed by multiplying a system usage rate times the connect time. In yet another embodiment of the present invention, the service terms comprise a service fee and the task matching server determines the service fee by multiplying a service usage rate times the connect time.

DETAILED DESCRIPTION

The following terms are used in the description that follows. The definitions are provided for clarity of understanding:

MS—Microsoft Corporation
UI—User Interface
XML—Extensible Markup Language
CSV—Comma Separated Values
CMS—Content Management System
Provider—A provider of technical support services.
Seeker—A user seeking technical support services.
Job—A service or service of assistance.
Transaction—A monetary agreement and exchange between Seeker and Provider based on a job.
Rating System/Merits—A user-scoring system based on transaction quantity and feedback
Locked—A user account that is notable to carry out any more work or view messages.
TMS—A task matching system that facilitates the matching of seekers to providers and provides functionality to permit an operator of a TMS to manage user accounts and charge for services provided.

In an embodiment of the present invention, a party seeking technical support services (herein, the "seeker") accesses a task matching server (TMS) via a network. In an embodiment of the present invention, the network is the Internet. The seeker searches a library of qualified providers of technical support services (referred to individually as a "provider"). The seeker is provided access to profiles of providers who are qualified to provide technical support services within an assigned classification. Each provider operates a provider software module that communicates the provider's current status to the TMS, which status is indicated in the profile of the provider. By way of illustration and not as a limitation, the status comprises an "online status", an "away status", a "busy status", and a "not-available status". In yet another embodiment of the present invention, the profile of a provider comprises a ranking and a customer satisfaction record.

Figure 1:
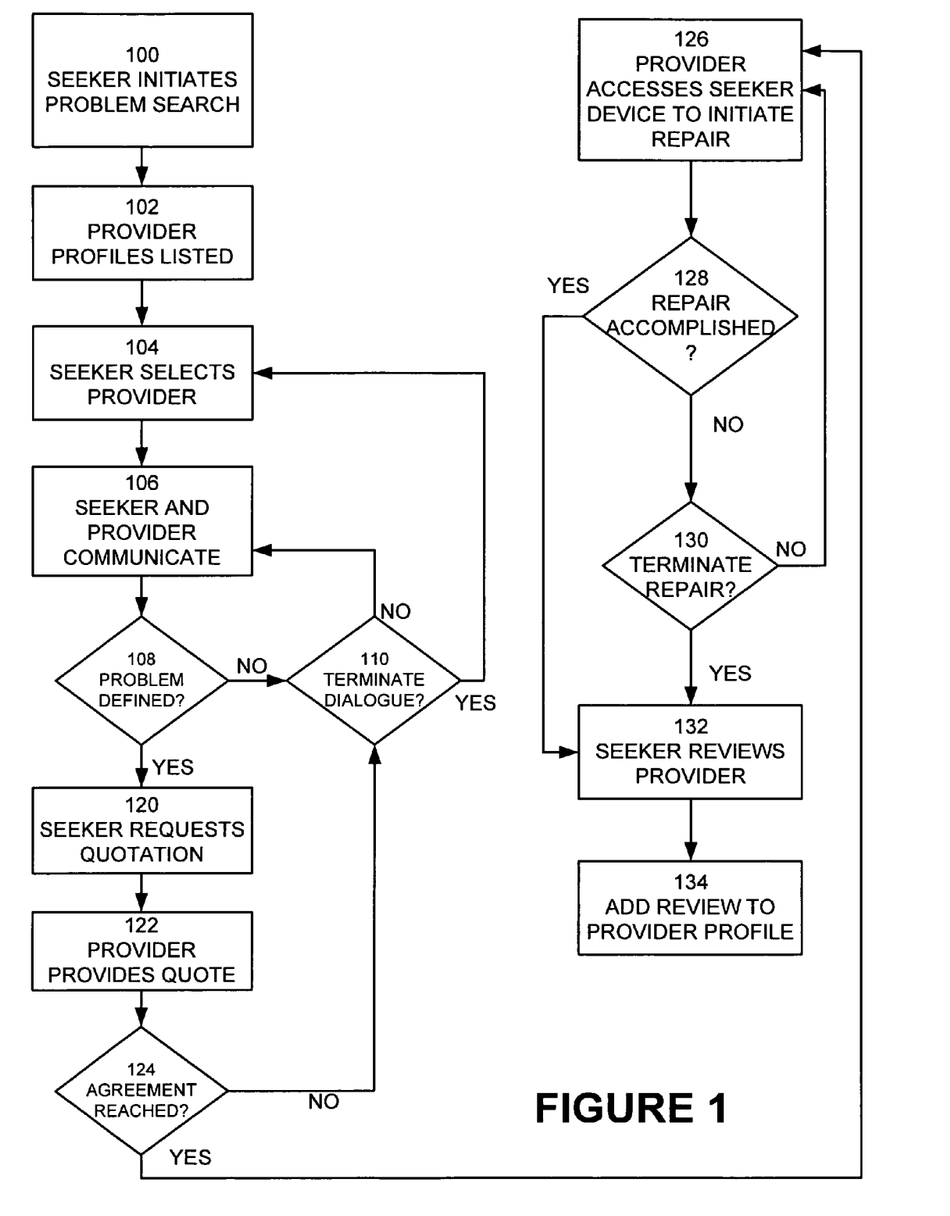
FIG. 1 illustrates a general flow of an interaction between a seeker and a provider using a task matching system according to an embodiment of the present invention.

FIG. 1 illustrates a general flow of an interaction between a seeker and a provider using a task matching system according to an exemplary embodiment of the present invention. In this exemplary embodiment, the seeker and the provider have registered with the task matching system (TMS) using methods well known in the art. The TMS is accessible via a network. In an embodiment of the present invention, the network is the Internet.

A seeker searches a library of qualified providers accessible to the TMS for help with a particular problem 100 associated with a network accessible device belonging to the seeker. As will be appreciated by those skilled in the art, the searching process may be facilitated by search aids such as drop down menus, pick lists, and similar means. The TMS performs a search using the supplied criteria and displays to the seeker a list of providers who have registered as having expertise related to the search criteria 102. In an embodiment of the present invention, the list of providers is displayed using a hierarchy based on the status of the provider. For example, providers may be ordered by online or offline status, rank, time online, number of previous jobs conducted.

The seeker reviews the displayed profiles displayed and determines which provider is best suited to address the problem of the seeker. The seeker then selects a provider to "interview" for the job 104. By way of illustration and not as a limitation, the seeker initiates communication with the provider using a live text messaging protocol.

In the exemplary embodiment, the seeker has previously downloaded a seeker software module that facilitates the communications between the seeker and the provider. The seeker software module, may, for example provide means for the seeker to send screenshots to the provider relevant to the problem that the seeker is attempting to solve. A screenshot may contain fault codes, messages, file listings, and configuration profiles to name a few.

A determination is made by the provider that the problem has been sufficiently defined 108. If the problem is not sufficiently defined, at any point in time, a decision may be made by either the seeker or the provider to terminate the dialogue between them 110. The decision may result in the dialogue continuing 106 or the seeker choosing another provider 104.

If the problem is defined, a seeker requests a quotation from the provider 120. The provider provides the seeker a quotation 122, which quotation comprises terms under which the provider will provide the services requested by the seeker. A decision is reached regarding the terms of the agreement between the parties 124. At any point in time a decision may be made by either the seeker or the provider that the terms are not acceptable 110. The decision may result in the dialogue continuing 106 or the seeker choosing another provider 104.

If an agreement is reached, the provider accesses the network accessible device to initiate repair 126 via the seeker and provider modules. By way of illustration, if the seeker is having problems with a computer, the provider accesses the computer via a network and takes control of the, mouse, keyboard and operating system. A determination is made whether the repair was accomplished 128. If the repair was not accomplished, a decision is made whether to terminate repair 130. If the decision is not to terminate repair, the repair process proceeds at 126. If the repair is terminated before the repair is accomplished, or if the repair is completed successfully, the seeker reviews the services provided by the provider 132 and posts the review to the TMS. The review is then incorporated into the provider profile 134.

Figure 2:
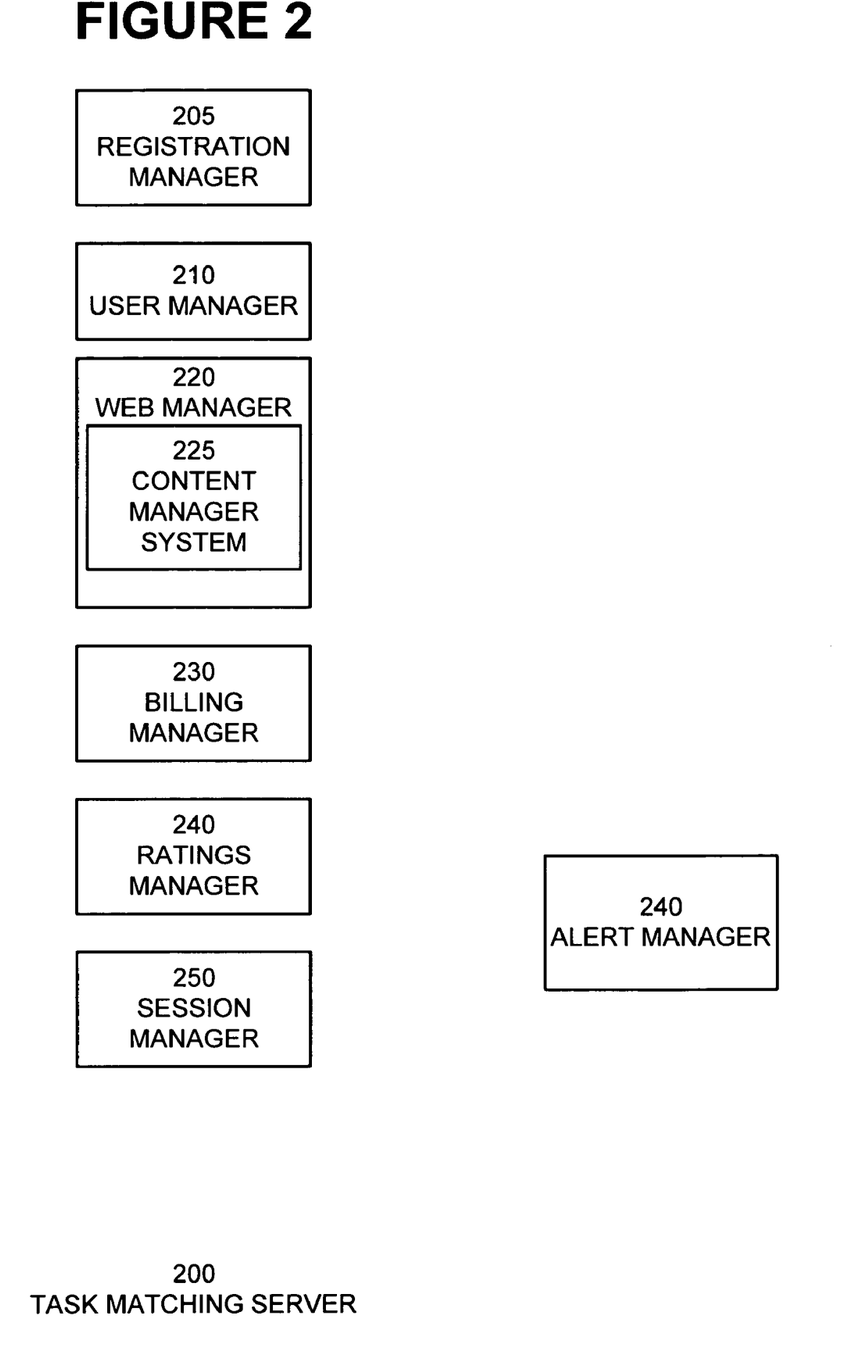
FIG. 2 illustrates the logical components of a TMS according an embodiment of the present invention.

The interaction between a seeker and a provider is supported by the task matching system (TMS). FIG. 2 illustrates the logical components of a TMS according an exemplary embodiment of the present invention. In the exemplary embodiment, the provider and seeker are required to leave feedback on the website regarding a repair session. Additionally, in this exemplary embodiment, the provider is required to register with the TMS, and such registration is free of charge. In order for the provider to offer services, the provider is required to pay for TMS software usage while connected to a seeker's device while affecting repair or repair evaluation. As will be appreciated by those skilled in the art, a task matching system may impose additional or fewer conditions on seekers and providers without departing from the scope of the present invention.

In this exemplary embodiment, the TMS comprises a registration manager 205, a user manager 210, a web manager 220, a billing manager 230, a session manager 240, matching manager 250, and an administration manager 260.

The registration manager 205 facilitates the registration of providers and seekers. Registration is a condition of access to many of the services offered by the TMS and for operation of the provider and seeker modules. The registration process will involve two different processes, depending on the registration type. A user can register as a seeker or a provider, or both.

Figure 3:
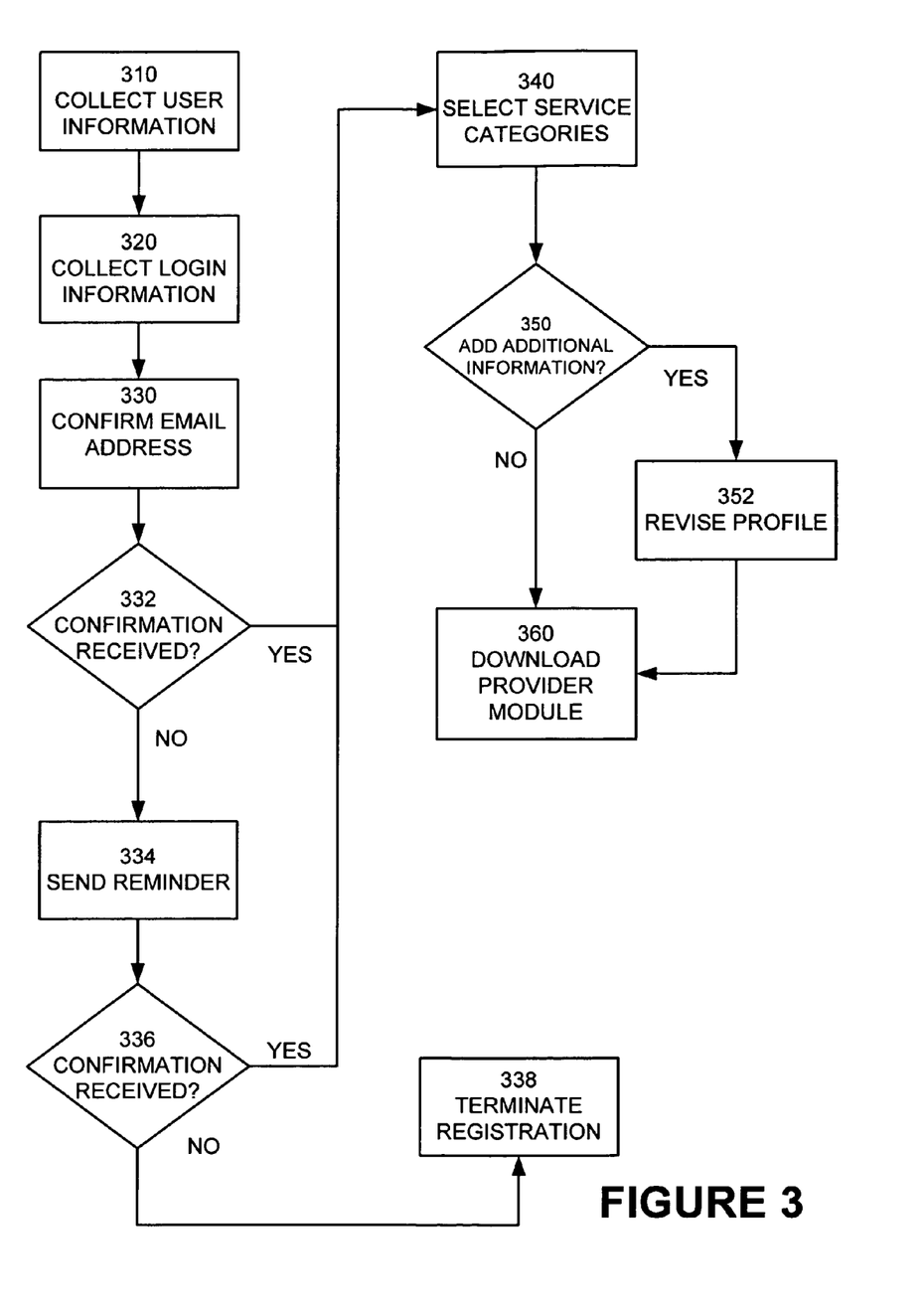
FIG. 3 illustrates a process by which a user may register as a provider according to an embodiment of the present invention.

FIG. 3 illustrates a process by which a user may register as a provider according to an embodiment of the present invention. The user provides personal information 310. In the exemplary embodiment, the personal information fields are:
Title—drop down list
First Name
Last Name
Date of Birth
Address Details:
   Building Name
   Building Number
   Street Address
   Town/City
   County
   Postcode—postcode lookup functionality, see 5.11.2—
     Postcode Searcher, for more information.
   Country—mandatory, drop down global list
   Primary Telephone—option to publish online
   Secondary Telephone—option to publish online
Email Address:—
   Email Address—mandatory
   Re-Type Email Address The user also provides information necessary to allow the user to login to the TMS 320:
Username. In the exemplary embodiment, an automatic check is performed when the user tabs out of the username field to determine if the username has been filled in. There is also a check to see if the username is taken. If it has, an alternative is given by the system.
Password. In the exemplary embodiment, a password is evaluated by a "strength meter" and the results provide to the user. A user is instructed to retype a password for confirmation purposes.
Payment information. A Paypal account may be identified. If a Paypal account is identified, the account is checked to determine that the account information is valid.
Disclaimer Acknowledgements. A user is presented with a User Agreement, a Privacy Policy Agreement and an Agreement to receive Communications from the operator of the TMS. Acknowledgement of the agreements is recorded. In the exemplary embodiment, the registration will not proceed without acknowledgement of these agreements. A user may also accept an agreement to receive communications from third parties. A user will also be required to acknowledge that the user is over a certain age. In the exemplary embodiment, to preclude automated registration, a set of slightly distorted image of numbers and letters will be displayed. User will be instructed to enter the numbers in a return field. The typed in data must match correctly the numbers shown in the image.

A user is then required to confirm the user's email address 330. The TMS will use the entered email address to send the user a link to the user's account. The user selects the link in the email to verify their email address is live. In the exemplary embodiment, a determination is made as to whether the user has verified the email address 332. If the user has not verified the email address after a preset time, a reminder is sent to the user 334. If the email address is not be verified within another preset time 336, the partially created account and username are deleted from the TMS 338.

If the email address is verified, the provider selects one or more service categories offered by the provider 340. In the exemplary embodiment, the screen will be divided into two sections, the left hand side will display categories available, the right hand side will list categories selected by the provider. The provider can browse through the list of main categories as defined by the super administrator. By way of illustration and not as a limitation, the service categories comprise the following:

Technologies
Software
Hardware
Areas of Expertise
Training

The provider selects subcategories within a category that are applicable to the provider and adds the subcategories to a list via an "add" button.

The provider may also search for a specific sub-category by typing in a keyword or keywords in a search box. A list of results will be displayed, grouped by categories. It will also be possible for the user to re-display the results grouped by manufacturer. The provider selects the results that are applicable to provider adds the results to a list via an "add" button.

If no results are displayed, the user is given an option to fill in a text field with a suggestion of a new category. The suggestion is emailed to the super administrator. The Super Administrator can add the category manually.

In the exemplary embodiment, the provider may choose to pay a premium to be featured at the top of any search results within a chosen "featured" category. This will be a fixed monthly fee, and will provide a rotation depending upon the number of users who have opted to be featured within the same category. In the exemplary embodiment, a preset number of "featured" providers will be identified to a seeker. The provider can select this option by checking a "Featured Category" tick box next to their selected categories in the right hand side of the list.

It will also be possible for a provider to select to highlight their results entry for a fee.

When the provider has finished selecting all relevant categories, the provider will be presented a summary screen to review all categories selected by the provider. The provider can add an optional free text description against each item as well as remove the item and select whether the item will be a "Featured Category."

The user will be required to agree to the payment terms for a featured category or highlighted category. This will be a description of terms and a button asking the user to accept. If the user does not choose to accept, the identification of a category as a "featured category" will be disregarded.

The provider may optionally add additional information to a profile 350. By way of illustration and not as a limitation, such additional information comprises:

A list of qualifications
A picture
A general description

The provider may preview a profile, which, in the exemplary embodiment, is broken down into the following tabulated sections:

General information and registered skills
Additional qualifications and description
Feedback and ratings table A unique link will also be displayed, that will allow people to view the provider's profile without the need to be a site user. This will act as an advertisable website for the provider.

The provider will then be prompted to download and install the provider module 360.

Figure 4:
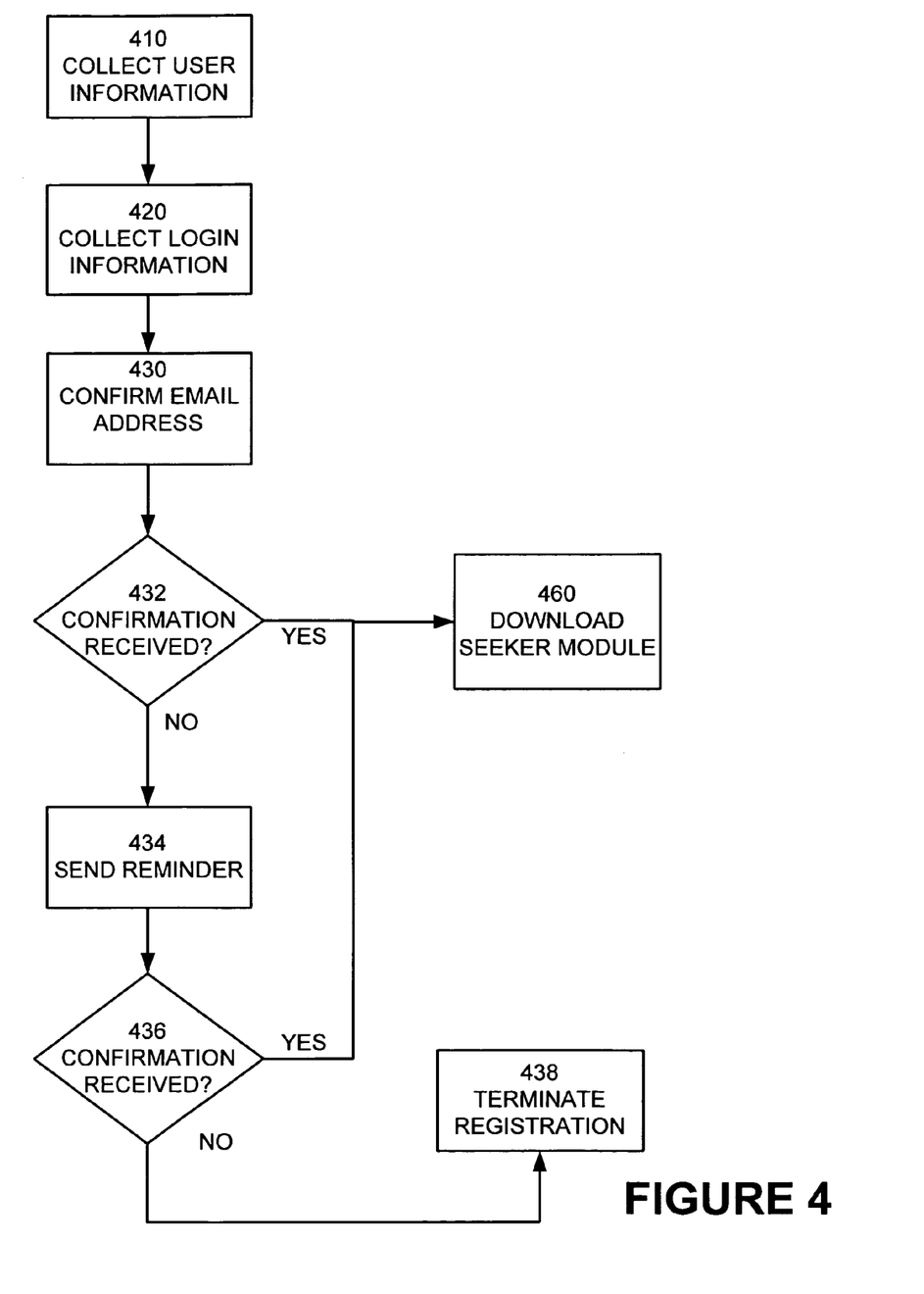
FIG. 4 illustrates a process by which a user may register as a seeker according to an embodiment of the present invention.

Referring to FIG. 2, the registration manager 205 facilitates the registration of seekers. FIG. 4 illustrates a process by which a user may register as a seeker according to an embodiment of the present invention. The user provides personal information 410. In the exemplary embodiment, the personal information fields are:

User Details:
    Title—drop down list
    First Name
    Last Name
    Date of Birth
Address Details:
    Building Name
    Building Number
    Street Address
    Town/City
    County
    Postcode
    Country—mandatory, drop down global list
    Primary Telephone—option to publish online
    Secondary Telephone—option to publish online
Email Address:
    Email Address
    Re-Type Email Address The user also provides information necessary to allow the user to login to the TMS 420:

Username. In the exemplary embodiment, an automatic check is performed when the user tabs out of the username field to determine if the username has been filled in. There is also a check to see if the username is taken. If it has, an alternative is given by the system.

Password. In the exemplary embodiment, a password is evaluated by a "strength meter" and the results provide to the user. A user is instructed to retype a password for confirmation purposes.

Disclaimer Acknowledgements. A user is presented with a User Agreement, a Privacy Policy Agreement and an Agreement to receive Communications from the operator of the TMS. Acknowledgement of the agreements is recorded. In the exemplary embodiment, the registration will not proceed without acknowledgement of these agreements. A user may also accept an agreement to receive communications from third parties. A user will also be required to acknowledge that the user is over a certain age. In the exemplary embodiment, to preclude automated registration, a set of slightly distorted image of numbers and letters will be displayed. User will be instructed to enter the numbers in a return field. The typed in data must match correctly the numbers shown in the image.

A user is then required to confirm the user's email address 430. The TMS will use the entered email address to send the user a link to the user's account. The user selects the link in the email to verify their email address is live. In the exemplary embodiment, a determination is made as to whether the user has verified the email address 432. If the user has not verified the email address after a preset time, a reminder is sent to the user 434. If the email address is not be verified within another preset time 336, the partially created account and username are deleted from the TMS 338.

If the email address is verified, the seeker module is automatically downloaded and installed 440.

Referring again to FIG. 2, the user manager 210 allows registered providers and seekers to set up and manage an account. In the exemplary embodiment of the present invention, a provider may:
Register
Download a provider module
Manage an account
Set up and manage a profile
Apply for preferential listing in searches
Provide quotations
Remotely Control a seeker's computer (upon agreement with the seeker)
Leave Feedback (rating system/merit scoring)

In the exemplary embodiment of the present invention, a seeker may:
Register
Download the seeker module
Manage an account
Set up and manage a profile
Request quotations from a provider
Agree to quotations
Assign and terminate permission for an seeker to access a network accessible device
Leave Feedback (rating system/merit scoring)

The user manager 210 also manages access to the TMS by internal users and external users. External users may be registered users or unregistered users. Internal users comprise a super administrator, a general administrator, and other users. In the exemplary embodiment, the super administrator's permissions are defined as:
Has the highest level of administrative access to the Backend Administrative System
Can manage permissions for user roles
Can reset passwords for anyone on the system
Can create, edit, view, activate, deactivate, archive and unarchive all user accounts
Can view all reports and statistic reports
Can view all logs
Can edit system settings
Manages backup schedules
Manage CMS content In order to facilitate management of the TMS, a super administrator is empowered to create user groups comprising a set of unique permissions for group members. When a user is assigned to a user group, the user acquires the permissions of the group. A user will be assigned to at least one user group. A general administrator may belong to one or more user groups. User groups have a hierarchical structure with unlimited depth. Each user group has a number of permissions assigned to it. Permissions are stored in an XML file and can be edited manually by the Super Administrator. In this way, a general administrator's permissions are determined by the super administrator and the group to which the general administrator is assigned.

Selecting a user group opens a popup window with permissions for that user group. In this way, the super administrator may change permissions for a user group.

In the exemplary embodiment, the super administrator manages all user accounts. In this embodiment, the user account data comprises a username, the user's first and last name, an account type, an account activation date, a last login date, and an account status. A button link will also allow the administrator to create a new account (website user) or general administrative user. Selecting a user name will open up the account details for that user. The super administrator may then modify the account information, including the status of the account. In this way, the super administrator may activate and deactivate a user account.

External users interact with the TMS through a web interface. In the exemplary embodiment, an registered seeker:
Has access to a user-specific welcome page
Has assess to the seeker module for downloading
Has access to the searching facility
Has access to the browsing facility
Has access to user-specific messages
Has access to user-specific my account
Has access to seeker profile creation
Has access to transaction-specific feedback
Has access to user-specific rating/merits system
Has access to dispute reporting
Has access to general news
Has access to success stories
Has access to FAQ
Has access to contact us
Has access to survey forms
Has access to help and feedback forms
Has access to dispute forms
Has access to tutorials
Has access to disclaimers In the exemplary embodiment, a registered provider:
Has access to a user-specific welcome page
Has assess to provider module for downloading
Has access to the searching facility
Has access to the browsing facility
Has access to user-specific messages
Has access to user-specific my account
Has access to provider profile creation
Has access to provider category registration
Has access to the Favorites list
Has access to transaction-specific feedback
Has access to user-specific rating/merits system
Has access to dispute reporting
Has access to general news
Has access to success stories
Has access to FAQ
Has access to contact us
Has access to survey forms
Has access to help and feedback forms
Has access to dispute forms
Has access to tutorials
Has access to disclaimers In the exemplary embodiment of the present invention, an unregistered seeker may interact with the TMS through a web interface. In this embodiment, an unregistered seeker:

Has access to registration
Has access to the forgot password trigger
Has access to the searching facility
Has access to the browsing facility
Has access to general news
Has access to success stories
Has access to FAQ
Has access to contact us
Has access to survey forms
Has access to help and feedback forms
Has access to tutorials
Has access to disclaimers In the exemplary embodiment of the present invention, external users are assigned to user groups that determine the permissions of the external user. The permissions of the user group may be set by default, subject to change by the super administrator. By way of illustration and not as a limitation, external users may be classified into the following user groups:

Unregistered external user
Seeker
Provider
Non-feedback-leaving seeker
Non-paying provider
Non-feedback-leaving provider The super administrator will have full access to create, edit and disable external users (seekers and providers) via the user manager 210. An external user may register with the TMS to create an account using the website registration process. In an exemplary embodiment of the present invention, a super administrator can determine the areas of the website that are accessible to unregistered seekers and seekers that fail to leave feedback. The super administrator may also define the allowable time period before a seeker's account is locked and the seeker is forced to leave feedback.

In the exemplary embodiment of the present invention, a provider is assessed for registering with the TMS and a fee for providing services to seekers. The super administrator can modify the permissions of a non-paying provider. The super administrator will also be able to define the allowable time period before the non-paying provider's account is locked and the provider is forced to pay the outstanding amount. Similarly, the super administrator may determine the permissions of a provider that does not comply with the obligations to leave feedback. The super administrator may also define the allowable time period before the provider's account is locked and the provider is forced to leave feedback.

In the exemplary embodiment, the user manager 210 allows seekers and providers to maintain contact lists. By way of illustration and not as a limitation, a contact list of a seeker may have the following categories:

Preferred providers
Current providers
Past providers
Favorite Contacts
Others

By way of illustration and not as a limitation, a contact list of a provider may have the following categories:

Favorite seekers
Current seekers
Past seekers
Favorite Contacts
Others

A user may define a new contact group, delete a user-defined contact group and rename a user-defined contact group. A contact list will be administrable via the website the user (seeker or provider) module.

A contacts list may be managed via the website using a "Add user to Contact List" button located on a profile, email etc. When this button be selected, the user will be asked to specify which contact group the new contact should be added to. The user can select a contact group from a drop-down list of currently available contact groups, and also opt to create a new contact group to add the contact to.

Using the user module, the user will be able to create new contact groups, delete non-default contact groups, rename contact groups and drag and drop existing users between contact groups.

An icon will be displayed against each user name allowing the user to block a contact from being visible, and unblocking a contact. A separate section will allow the user to manage a list of blocked and unblocked contacts, and the user can move a contact between the two lists.

Web manager 220 provides access to the TMS to external users, both registered and unregistered via a network. In an embodiment of the present invention, the network is the Internet. In the exemplary embodiment, the web manager 220 allows an external user to register, log in, manage an account, search for providers, browse for providers, download an appropriate module, and view areas of the site to which the user type has permission to access.

The web manager 220 comprises a content management system (CMS) 225, which can be maintained by the super administrator and, if authorized by the super administrator, the general administrators. The CMS 225 allows the administrator to manage and maintain content via an interface that supports normal text entry, html formatting and image uploading and pasting. Content is modifiable within the predefined website style templates. Content may be customized based on the user group to which an external user belongs. A welcome page specific to seekers comprise links to news articles and tutorials relevant to their user type. Similarly, a welcome page specific to providers may comprise links to news articles relevant to their user type.

Alert messages may also be displayed to users who have logged in, notifying them of the following:

Any new messages
Any feedback required
Any payments required
Any quotations requested
Any quotations received
Any Favorite users online
Any job status changes (complete, rejected)
Remote Connection Requested
New Invoices
Job Completion Confirmation Request
Job Completion Confirmation Acceptance
Job Completion Confirmation Rejection News articles may placed on a welcome page as determined by the super administrator and/or an authorized general administrator. Thus, an unregistered seeker may not have access to articles that are available to registered seekers. News articles may be archived for future reference and accessed via search engine.

The CMS 225 also supports frequently asked question (FAQ) system.

The CMS 225 facilitates the posting of disclaimers regarding the use of the TMS. By way of illustration and not as a limitation, a disclaimer in the form of a user agreement and a privacy statement may be presented on web pages determined by an administrator. In the exemplary embodiment, the registration manager 205 determines that an external user has acknowledged the user agreement and privacy statement as a condition of registering the external user. If a disclaimer is updated, it will automatically be displayed for all registered users upon login. The user will be notified of an update to the disclaimer and the user will be required to acknowledge acceptance of the disclaimer as modified.

The CMS 225 may also provide content for contact information, email links, user survey forms, help pages, dispute forms and procedures, and feedback forms.

In the exemplary embodiment, the web manager 220 manages browsing functions that permit seekers and unregistered users to search for providers. Providers are assigned to categories by administrators. The browsing functionality provides categories alphabetically. A user accesses a category by selecting it thereby opening a list of related subcategories. In the exemplary embodiment, providers are listed within the sub-categories in a results table. The table will, by default, display featured providers at the top, followed by providers that are online. Offline providers are not displayed by default. As will be appreciated by those skilled in the art, other default conditions may be established without departing from the scope of the present invention.

In the exemplary embodiment, the provider results are displayed in columns organized as follows:
Online/Offline Status
Provider name
Jobs performed this week
Average Job Cost
Paypal Verified
Time spent online
Reputations
Programs Supported A drop down list allows the user to specify whether to filter the results so that only online providers are displayed, only offline providers are displayed, or all providers are displayed, regardless of online/offline status. In the exemplary embodiment, the drop-down filter defaults to the "online only" option will be appreciated by those skilled in the art, other default conditions may be established without departing from the scope of the present invention.

Each column is selectable, and will re-sort the results in descending order. Selecting the column heading again will re-sort the results in ascending order, and so on. Selecting a listed provider will then take the user to the provider's profile.

In the exemplary embodiment, CMS 225 manages the display of advertising banners that may be displayed in a chat dialogue box prior to an active session. The advertising banners are taken in rotation from the CMS 225.

Web manager 220 further comprise a search facility to search for one or more keywords. The search facility matches key words with those listed against each specific category and returns providers who have registered with any of those categories.

In the preferred embodiment, web manager 220 allows a seeker to request a quotation via the messaging system. The seeker selects a provider and selects a "request a quotation" button on the provider's profile. A formal message appears, prompting the seeker to enter details of the problem. The message will also include the category in which the seeker found the provider listing. The seeker sends the request to the provider. The provider sends a quotation offline. The seeker reviews the payment terms, payment type and amount, and determines whether to accept or reject the quotation, with the option to give a reason.

If a quote has been accepted and a quote response given, the seeker may cancel the transaction prior to an active control session being initiated through the seeker module and/or to a payment being made. In the exemplary embodiment, if the transaction is cancelled by the seeker, the seeker is required to give a reason. The provider and seeker will then be required to leave feedback for each other. All quotations and proposals are recorded against a job number.

In the exemplary embodiment, billing manager 230 provides functionality that facilitates the billing of seekers by providers and the billing of providers by the operator of the TMS.

A provider can opt to bill a seeker in two ways based on a firm fixed price or on a timed price basis, per minute or per hour as required. Billing manager 230 records the payment type, the payment amount, and any milestones that require payment by the seeker. By way of illustration and not as a limitation, a milestone for payment may be reached when the provider initiates remote repair of a seeker's network accessible device via a link between the seeker module and the provider module. The billing manager 230 obtains the length of time the provider spends connected to the network accessible device from a session manager (see, discussion regard sessions manager 250). The provider is charged based on the length of time spent in "active" remote connection mode, regardless of provider's payment request type.

A provider and seeker establish the timing and method of payment during a negotiation session that precedes the acceptance by the seeker of a proposal from the provider. By way of illustration and not as a limitation, if the agreement is for repair for a fixed priced, the provider and seeker may agree to payment in full up front, fifty percent up front and fifty percent upon job completion, full payment on job completion, or no charge.

In the exemplary embodiment, "job completion" is deemed to have occurred upon the occurrence of any of the following:
The provider sending a notification to the seeker that the job is successfully closed and the seeker accepting that the job is closed within 48 hours (or another set specified timeframe)
The provider sending a notification to the seeker that the job is successfully closed and the seeker not replying within 48 hours
The provider sending a notification to the seeker that the job is unsuccessfully closed and the seeker accepting that the job is close within 48 hours
The provider sending a notification to the seeker that the job is unsuccessfully closed and the seeker not replying within 48 hours
An administrator assigning the job as successfully or unsuccessfully closed, in the event of a dispute.

If a seeker has agreed to payment for services based on an hourly rate, the payment will be determined based on the commencement of services as determined by the initiation of repairs and a determination of job completion using any of the above criteria. The amount to be paid the provider by the seeker is calculated based on the time spent, rounded up to the nearest whole minute, times the agreed to rate.

Billing manager 230 further accounts for promotional codes that can be issued existing providers and prospective providers. A promotional code results in the provider receiving a credit such that the provider may be in "active" remote connection mode for a set period of time without being charged. A promotional code is entered in to a referral code table maintained by billing manager 230 along with the credit amount.

A referral code is promotional code that is unique to a registered user. A registered provider distributes the referral codes to other providers. The registered provider is receives a "chit" for each new provider registration that includes the referral code of the registered provider. The chit is issued when the new provider incurs a billable transaction via the TMS. When the registered provider accumulates a preset number of chits, the registered provider receives a credit to its account.

Billing manager 230 also supports dispute resolution systems. A dispute may be initiated by a provider or seeker using a dispute form for any job that has not been closed and marked as paid. For example, a provider will not be able to dispute a job if the provider has sent a notification to a seeker that the job is successfully closed, and the provider has confirmed payment receipt, if the seeker has also confirmed job closure. A seeker will not be able to dispute a job if the seeker has agreed to close a job that was unsuccessful, even if payment has already been made initially. The super administrator is authorized to issue an additional chargeable item on a provider's next due invoice, with description and amount and cancel any outstanding amount owned by the seeker to the provider.

Billing manager 230 additionally maintains a transactions history for both seekers and providers. An archive retention policy may be established to delete older records.

Ratings manager 240 manages a rating system that provides statistical information about providers. In the exemplary embodiment, the rating manager determines the number of positive reviews that a provider receives. Ratings are automatically assigned by the system to provider profiles. Below is the example of the rating system scoring of the exemplary embodiment:

- More than 10 positive feedbacks rewards the user with a Red star
- More than 50 positive feedbacks rewards the user with a Blue star
- More than 500 positive feedbacks rewards the user with a Silver star
- More than 5000 positive feedbacks rewards the user with a Gold star
- More than 10000 positive feedbacks rewards the user with a Green star CMS 225 also facilitates the communication of provider ratings and seeker comments. In the exemplary embodiment, a section of the website explains the rating system. This section is modifiable within the CMS by an administrator.

A session manager 250 facilitates communications via a user module (either a seeker module or a provider module). The session manager monitors the length of time that a provider spends connected to the network accessible device and makes this information available to billing manager 230. In the exemplary embodiment, the sessions manager supports the following functionality of the user module:

- Allow user-prompted termination of remote control at any time
- Allow online chatting between users
- Allow offline messages to be sent
- Allow seekers to request, accept and decline quotations
- Allow providers to provide a quotation and store a quotation request
- Allow providers to specify payment terms and payment amount
- Allow multiple chat windows (similar to ms messenger)
- Display the contacts list
- Display system popup alerts
- Access personal preferences saved by each individual user, including nickname
- Allow shortcut, pre-typed statements to be inserted into the chat window
- Monitor external URL links that appear within the chat window and trigger a default warning
- Save chat records in a local log file, by default
- Send a log file to the TMS administrator upon user request (in dispute cases)
- Display an advertising banner in the chat window prior to paid-for job
- Allow the site to know that user is signed in and online
- Allow file transfer
- Allow login to the TMS A previously described, a seeker locates a provider. The seeker may select a link to commence "chatting" with the provider if the provider is also online. This will open a chat dialogue window between the seeker and the provider. When the seeker first enters a chat session with a provider, the provider will be able to see the seeker's name and view the seeker's profile by selecting the seeker's name. The name is a hyperlink which opens the profile of the seeker in a new browser window. The provider will then be able to view the seeker's profile and any feedback and ratings they may have received. As well as the seeker's first message, the provider is also provided with a short summary generated by the system, stating the category that the seeker was browsing prior to selecting the provider's profile and selecting the "chat" link. If a provider replies, a dialogue is now established. It is up to the provider and seeker to describe the problem and to work out a price. There is also the ability to send a maximum of three screenshots per chat session using an "easy-capture button" provided by the user modules.

The price is submitted formally in the form of a quotation request, quotation response and quotation acceptance or rejection. In the exemplary embodiment, both the seeker and provider are guided through this process by a process wizard implemented in the user module. Once an agreement is reached, and payment terms are finalized and fulfilled, the provider is prompted to activate the remote control invitation. The seeker then accepts the invitation, which initiates the session timer that is monitored by the session manager 250.

A provider, upon deciding to close a transaction (either successfully or unsuccessfully completed) will have the option to select "close job" within the provider module chat window. The provider can request that a seeker respond with an acknowledgement that the job is completed. This may be accomplished using a drop-down list option.

The seeker will be given an option of responding within a preset time period to confirm the transaction is complete. It will be possible for the seeker to respond immediately via the seeker module by selecting a "Accept job as successfully closed" option, a "Accept job as unsuccessfully closed" option, keep job open option (with a prompt for the seeker to give a reason, which is recorded within the job number's notes history), or a "decide later" option. The "decide later" option will cause an email to be sent to the seeker's inbox reminding the seeker to close the job. If no response is received from the seeker within the preset time period, the job will be automatically marked as completed. If the transaction has any outstanding payments, the seeker will then be sent an invoice. Feedback will then be required.

When a seeker tries to contact the provider, and if the provider declines a chat, the provider is prompted to give a reason, such as "Busy" or "Not Interested." The seeker is then notified by a system message and the provider's reason is provided. If the provider is in an active remote session, the message from the seeker is automatically logged for later viewing—it will be sent to the provider's inbox and a pop-up alert will appear, notifying the provider. A standard message to the seeker will be displayed, informing them that the provider is currently in a remote session and not available. The chat window prompts the seeker to leave a message or close chat. If the user selects the option to leave a message, a message window appears where the user can type in a message which is then emailed to the provider's mailbox on the TMS. In the exemplary embodiment, a .wav file will play, informing the provider that a message has been sent. If the user selects "no" when prompted to leave a message, the chat window is closed.

If the screen is locked, the user module assumes an "away" status. If the user enters the full screen mode in any application, the user module also assume an "away" status. "Full screen" is defined as when the whole screen is used. Optionally, an alert window will be triggered to alert the provider of a new message.

If a seeker does not receive a response within a preset period following an initial request to chat, the seeker is informed that the provider may be away. The chat window will ask if the user wishes to leave a message or close chat. If the user selects the option to leave a message, a message window appears where the user can type in a message which is then emailed to the provider's mailbox on the TMS. In the exemplary embodiment, a .wav file will play, informing the provider that a message has been sent. If the user selects "no" when prompted to leave a message, the chat window is closed.

In the exemplary embodiment, the provider may specify an "away" status, thus notifying other users that the provider is not available. An "away" icon will appear against the provider status in the contacts list and also on the website, where applicable.

In the exemplary embodiment, session manager 250 manages a remote session between a provider module and a seeker module. When a provider begins a remote session, the provider acquires control over various attributes of the seeker machine. By way of illustration and not as a limitation, the provider may:

Choose to work in greyscale, 8 bit color, etc
Send a reboot and reconnect request to the seeker's machine
Allow the seeker to view the provider's desktop
Terminate the remote control session
Send a request to a seeker for full access to the remote machine
Initiate a file transfer
View a status bar—When in session, a text bar notifies the provider that its connected, specifies the total time elapsed Upon initiation of the remote session, the seeker module will automatically be minimized, along with chat windows. When in remote session, no seeker chat windows will be visible to the provider. The remote session will only function on the primary screen of the users. The provider will only be able to view the programs made available to the provider by the seeker, and will only be able to perform operations within the remote preferences specified by the seeker. The windows of programs not selected as viewable will be hashed out. If an application that is not being shared be in the way, the provider will have the ability to minimize that application. If an approval by the seeker is requested by the provider, the provider will wait for a feedback response from the seeker but billing will still occur until the session is terminated by the provider.

In the exemplary embodiment, the session manager 250 facilitates the operation of the seeker module. By way of illustration and not as a limitation, a seeker may:

Request a quotation
Save the quotation (and send it to their inbox for off-line processing, see 3.4.2.1—working via offline messaging, for more information)
Agree or reject quotation
Accept a remote session
Pause a session—(billing is also paused)
Regain control of mouse during a session
Cancel a session
Accept a reboot and session reconnection
Mark a job as successfully/unsuccessfully completed
Monitor total time elapsed on an active job
Accept an invitation to view the provider's screen
Set remote control preferences and permissions
Accept and decline file transfer The seeker may send a quotation request via the seeker module. In the exemplary embodiment, a "request quotation" button is presented in a chat window. If the seeker selects the request quotation button, an alert will prompt the provider to provide a quotation. The provider has the option to provide a quotation later (in which case, an email of the request for a quotation is sent to the provider's inbox and they can process the quotation via offline messaging as describer previously). If the provider chooses to provide a quotation online, via the user module, the provider enters in a payment amount and payment type and submits the quotation to the seeker. The seeker module displays additional buttons allowing the seeker to either accept or reject the quotation. The seeker can then choose to accept or reject the quotation by selecting the appropriate button.

Once a quote has been accepted and a quote response given, including payment terms and price, it will not be possible to recall the quotation. If the quotation is then rejected by the seeker, the provider has the option to re-quote. All quotations and proposals are recorded against the job number.

When a provider tries to contact the seeker, if the seeker declines a chat, the seeker is prompted to give a reason, such as "Busy" or "Not Interested." The provider is then notified by a system message and the seeker's reason is provided. If the seeker is in an active remote session, the message from the provider is automatically logged for later viewing—it will be sent to the seeker's inbox and a pop-up alert will appear, notifying the seeker. A standard message to the provider will be displayed, informing them that the seeker is currently in a remote session and not available. In the exemplary embodiment, a .wav file will play, informing the seeker that a message has been sent.

If the screen is locked, the user module assumes an "away" status. If the user enters full screen mode in any application, the user module also assumes an "away" status. "Full screen" is defined as when the whole screen is used. Optionally, an alert window will be triggered to alert the seeker of a new message.

If a provider receives no response within a preset period following an initial request to chat, the provider is informed that the seeker may be away. In the exemplary embodiment, a .wav file will play, informing the seeker that a message has been sent.

In the exemplary embodiment, the seeker may specify an "away" status, thus notifying other users that the seeker is not available. An "away" icon will appear against the seeker status in the contacts list and also on the website, where applicable.

Before a remote session is established between a provider and a seeker, the seeker is given the option to accept or reject a remote control invitation from a provider. If an invitation is rejected, the provider is notified. A job is not considered active until remote control session is activated for the first time. When a seeker accepts a provider's invitation, a default message will appear, giving instructions to the user on permissions setting. This message will also carry a warning message. A permissions window will display, listing all the active programs on the desktop of the seeker. The seeker may specify what applications to share by selecting check boxes against each listed application. A shared application will be marked with an icon indicating that the provider has access to that application. An option may be provided for the seeker to share all applications. The seeker module will automatically be minimized during the remote session, along with other chat windows.

In the exemplary embodiment, the seeker module provides the seeker the ability to grant the provider varying degrees of control over the seeker's machine. In this embodiment, all functionality of the machine that is permissible will be listed, with the option for the seeker to select one, many or all permissions. If this feature is used, a warning alert box will be displayed to confirm the seeker's actions to allow additional advanced permissions to the provider. When a warning alert appears, there will be an option to not be reminded again within that session.

By of illustration and not as a limitation, advanced permissions comprise:
  View only access
  Full access
  Specific application(s) access
  Allow file transfer
  Allow reboot request
  Grant all permissions In the exemplary embodiment, during a remote session a text bar notifies the seeker that it is connected, specifies the total time elapsed, and provides instructions on how to pause a session and terminate a session. In the exemplary embodiment, the seeker can terminate the session by pressing the escape key. The session is then paused, and a chat screen is displayed. The chat screen comprises a reactivate button. Billing is also paused until the reactivate button is selected. Additionally, the seeker may regain control of a pointing device connected to the seeker's machine actuating the pointing device. Both the provider and the seeker will be alerted that the pointing device is under control of the seeker.

In the exemplary embodiment, a participant in a remote session may request to transfer a file to the other session participant. A pop-up window will appear on the receiving participant's desktop, prompting that participant to accept or decline the file transfer request. Alternatively, a participant may set a permission in the user module to accept all file transfer requests. The sending participant will be notified when a transfer is accepted, successful, rejected, etc.

The session manager 250 provides a "heartbeat" functionality that monitors and records connections between seekers and providers. The "heartbeat" functionality logs the billable connection time spent on a job from both the seeker's end and the provider's end. A "heartbeat" is sent to the session manager 250 to confirm that there is still an internet connection. If a heartbeat fails, then the connection has dropped and will need to be re-established. All times are logged. A discrepancy check is performed to determine the time recorded against a seeker and the time recorded against the provider. An algorithm calculates an allowable margin of difference between the two users' times. The algorithm takes into account the number of connections made and the overall length of time of the session. If the session times as determined by the seeker and the provider fall outside of this margin, an alert will be triggered and an administrator will be notified by email. The notice comprises the two user names and the job number.

A system and method for obtaining technical support services over a network have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A system for obtaining technical support services over a network comprising:
  a task matching server connected to the network and comprising a library of provider profiles comprising qualifications of registered providers of technical support services; and
  a seeker computer, wherein the seeker computer comprises a first processor configured with software executable instructions to cause the seeker computer to perform operations comprising:
    submitting a search request from a registered seeker to the task matching server, wherein the search request comprises search criteria for identifying registered providers having specific qualifications;
    receiving from the task matching server a list of the registered providers having provider profiles in the library of provider profiles meeting the search criteria; and
    submitting a request for technical services to the task matching server, wherein the service request comprises an identifier of a service provider selected from the list; and
  the task matching server comprises a second processor that is configured with software executable instructions that cause the task matching server to perform operations comprising:
    searching the library of provider profiles against the search criteria;
    forwarding the request for technical support services from the seeker computer to a computer of the selected service provider;
    forwarding a quotation for technical support services from the computer of the selected service provider;
    forwarding a response to the quotation from the seeker computer to the computer of the selected service provider; and
    establishing a link between the computer of the selected provider and a network accessible device in need of support services if the response from the seeker computer is an acceptance of the quotation, wherein the computer of the selected provider computer is adapted for accessing the network accessible device via the link so as to facilitate the provision of technical support services.

2. The system of claim 1, wherein the second processor is further configured with software executable instructions that cause the task matching server to perform operations comprising rating the selected provider based on feedback provided by the registered seeker and storing the rating in a profile of the selected provider within the library of provider profiles.

3. The system of claim 2, wherein the second processor is further configured with software executable instructions that cause the task matching server to perform operations comprising requesting feedback from the registered seeker upon completion of the provision of technical support services.

4. The system of claim 1, wherein the second processor is further configured with software executable instructions that cause the task matching server to perform operations comprising recording the qualifications of a registered provider in a registered provider profile.

5. The system of claim 1, wherein the provider profile comprises a status of the provider.

6. The system of claim 5, wherein the status is selected from the group consisting of an on-line status, an off-line status, a busy status, an away status, and an unavailable status.

7. The system of claim 1, wherein search criteria comprise a requirement that a registered provider have an on-line status and wherein the second processor is further configured with software executable instructions that cause the task matching server to perform operations comprising providing the registered seeker a list of registered providers having an on-line status.

8. The system of claim 1, wherein the second processor is further configured with software executable instructions that cause the task matching server to perform operations comprising measuring a connect time during which the network accessible device in need of support services and the selected provider computer communicate via the link.

9. The system of claim 8, wherein the second processor is further configured with software executable instructions that cause the task matching server to perform operations comprising determining a provider fee for use of the task matching server.

10. The system of claim 9, wherein the provider fee is computed by multiplying a system usage rate times the connect time.

11. The system of claim 8, wherein the service terms comprise a service fee, wherein the second processor is further configured with software executable instructions that cause the task matching server to perform operations comprising determining the service fee, and wherein the service fee is computed by multiplying a service usage rate times the connect time.

12. The system of claim 1, wherein the network is the Internet.

13. A method for obtaining technical support services over a network comprising:
applying search criteria to a library of provider profiles comprising qualifications of registered providers of technical support services stored on a task matching server to identify one or more registered providers having specific qualifications;
receiving at a seeker computer a list of registered providers meeting the search criteria;
sending a request for support services to a computer of a selected service provider via the task matching server;
receiving at a seeker computer a quotation for technical support services from the computer of the selected service provider, wherein the quotation comprises service terms under which the selected provider is willing to provide the technical support services;
establishing a link via the network between a computer of the selected provider and a network accessible device in need of support services when the response from the seeker computer is an acceptance of the quotation; and
accessing the network accessible device in need of support services via the link so as to facilitate the provision of technical support services to the computer requiring support services.

14. The method of claim 13, wherein the method further comprises the task matching server creating a rating for the selected provider based on feedback provided by the registered seeker and storing the rating in a profile of the selected provider within the library of provider profiles.

15. The method of claim 14, wherein the method further comprises requesting feedback from the registered seeker upon completion of the provision of technical support services.

16. The method of claim 13, wherein the method further comprises recording the qualifications of a registered provider in a registered provider profile within the library of provider profiles.

17. The method of claim 16 further comprising the task matching server associating a status with the registered provider and recording the status in the registered provider profile.

18. The method of claim 17, wherein the status is selected from the group consisting of an on-line status, an off-line status, a busy status, an away status, and an unavailable status.

19. The method of claim 13, wherein search criteria comprise a requirement that a registered provider have an on-line status and wherein the list of registered providers comprises the on-line status.

20. The method of claim 13 further comprising the task matching server measuring a connect time during which the network accessible device in need of support services and the selected provider computer communicate via the link.

21. The method of claim 20 further comprising the task matching determining a provider fee for use of the task matching server.

22. The method of claim 21, wherein the provider fee is computed by multiplying a system usage rate times the connect time.

23. The method of claim 20, wherein the service terms comprise a service fee, and wherein the method further comprising the task matching server determining the service fee by multiplying a service usage rate times the connect time.

24. The method of claim 13, wherein the network is the Internet.

* * * * *